United States Patent Office 3,138,607
Patented June 23, 1964

3,138,607
CERTAIN 2-(THIO-AZOLYL)-BENZAZOLES
Horace D. Brown, Plainfield, N.J., assignor to Merck & Co., Inc., Rahway, N.J., a corporation of New Jersey
No Drawing. Filed Mar. 1, 1961, Ser. No. 92,450
9 Claims. (Cl. 260—302)

This invention relates generally to new chemical compounds. More particularly, it relates to derivatives of heterocyclic compounds. Still more specifically, it is concerned with benzothiazoles and benzoxazoles which have attached at the 2-position a heterocyclic ring containing nitrogen and sulfur as hetero atoms. It is concerned further with the synthesis of such novel compounds and with the use of such substances in the treatment and prevention of helminthiasis.

The infection known as helminthiasis involves infestation of the body and particularly the gastrointestinal tract of man and other domestic animals such as cattle, sheep, goats, swine, dogs and poultry with species of parasitic worms known as heliminths. Among the helminthic parasites, the nematodes of the genera Haemonchus, Trichostrongylus, Ostertagia, Nematodirus, Cooperia, Bunostomum, Oesophagostomum, Chabertia, Trichuris, Ascaris, Cappillaria, Heterakis and Ancylostoma are the most common parasites of domestic animals. The diseases attributable to such parasitic infections, such as ascariasis, trichostrongylosis and gross parasitism are very widespread and serious. The diseased host almost inevitably suffers from such conditions as malnutrition, anemia and general weakness. However, in addition to the above conditions which, of course, necessitate increasing the nutrient intake by the host, helminthiasis may have more disastrous consequences. The diseased host may suffer from severe inflammation of the intestinal lining resulting in hemorrhaging. Moreover, more advanced and uncontrolled cases of helminthiasis can lead to prostration and death. It is obvious from the above that helminthiasis is a disease of major concern from the standpoint of both public health and economic losses brought about by infestation of domestic animals with parasitic worms and that the provision of methods and compositions which are effective in preventing and treating helminthiasis would be highly welcomed.

It has now been found that certain 2-substituted benzothiazoles and benzoxazoles have a high degree of activity against helminthiasis. One object of the present invention is, therefore, the provision of new benzothiazoles and benzoxazoles. A more particular object is provision of benzothiazoles and benzoxazoles which have a specific type of substituent at the 2-position of the molecule. An additional object is the provision of syntheses of these new compounds. Further additional objects will become clear from the following detailed description of the invention.

The heterocyclic compounds which are the subject of this invention are 2-substituted benzothiazoles and benzoxazoles having the following structural formula

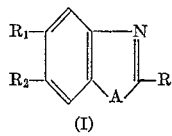

(I)

In the above structure, A is oxygen or sulfur. R is a five-membered heterocyclic radical wherein the hetero atoms are nitrogen and sulfur. Thus, the five-membered ring in the substituent R is composed of carbon, nitrogen and sulfur atoms. $R_1$ and $R_2$ may be hydrogen, lower alkyl, lower alkoxy, alkylthio, aryloxy or arylthio substituents. It is preferred that at least one of the groups $R_1$ and $R_2$ be hydrogen although compounds wherein both of these substituents are alkyl, alkoxy, alkylthio, aryloxy or arylthio radicals are included within the purview of the invention.

The five-membered heterocyclic radical (R in Formula I), which is attached to the 2-position of the benzothiazole or benzoxazole nucleus, may be a thiazolyl, isothiazolyl or thiadiazolyl radical. When R is a thiazolyl or isothiazolyl moiety, the point of attachment to the benzothiazole or benzoxazole nucleus may be at any one of the three carbon atoms of the five-membered heterocyclic ring, as indicated by the broken lines in the partial structures:

When R is a thiadiazolyl group containing two nitrogen atoms and one sulfur atom in the ring, the radical may be attached at either of the two carbon atoms in a 1,2,3-thiadiazole or a 1,2,4-thiadiazole:

With the symmetrical thiadiazoles, i.e. 1,2,5-thiadiazole or 1,3,4-thiadiazole, only one point of attachment exists:

The heterocyclic radical may, if desired, be further substituted at a carbon atom with a lower hydrocarbon group such as a lower alkyl radical, the only limitation in this regard being that imposed by the accessibility of the substituted thiazoles, isothiazoles or thiadiazoles to be used as starting materials. 2-(2'-thiazolyl)-benzoxazoles having a lower alkyl group at the 4-position of the thiazole ring and 2-(5'-isothiazolyl)-benzothiazoles having a lower alkyl group at the 3-position of the isothiazole ring such as 2-(4'-methyl-2'-thiazolyl)-benzoxazole and 2-(3'-methyl-5'-isothiazolyl)-benzothiazole are illustrative of this aspect of the invention.

As previously stated, $R_1$ and/or $R_2$ may be hydrogen, lower alkyl, lower alkoxy, lower alkylthio, aryloxy or arylthio groups. Typical examples of these are lower alkyl substituents such as methyl, ethyl, propyl, amyl and isopropyl radicals, alkoxy groups such as methoxy, ethoxy, isopropoxy and the like, and alkylthio substituents of which methylthio, ethylthio and butylthio radicals are representative. The aryloxy and arylthio groups are preferably phenoxy and phenylthio although alkylated phenoxy and phenylthio radicals may be employed if desired. Although it is preferred that at least one of these substituents which are present at the 5- and 6-positions of the benzothiazole or benzoxazole ring be hydrogen, this is not essential and compounds wherein $R_1$ and $R_2$ are other than hydrogen, and are the same or different, form a part of the present invention. The variation of $R_1$ and $R_2$ within the above definition is limited only by the availability of suitable starting materials for chemical synthesis.

The compounds of Formula I hereinabove may be obtained by a variety of processes. One such method comprises the reaction together of o-aminophenol or o-aminothiophenol, which compounds may be substituted in the 4- and/or 5-positions with a lower alkyl, lower alkoxy, lower alkylthio, aryloxy or arylthio radical, with a thiazole, isothiazole or thiadiazole carboxylic acid or derivative thereof. Suitable derivatives of such carboxylic acids are the acid halides, esters, amides and nitriles. The reaction is carried out by intimately contacting the two starting materials in substantially equimolar amounts at an elevated temperature. The benzothiazole or benzoxazole may be obtained by merely fusing the two reactants in the absence of a solvent although it is preferred that the process be conducted in an organic solvent medium and preferably in an aromatic hydrocarbon such as benzene, toluene or xylene. The process is conveniently carried out at temperatures of from 70–120° C. When formation of the desired 2-substituted benzothiazole or benzoxazole is complete, the product may be isolated and purified by known methods such as by removal of the solvent under reduced pressure and either crystallization or sublimation of the residual heterocyclic compound. Compounds of the present invention which may be prepared according to the above process include 2-(4'-thiazolyl)-benzoxazole, 2-(2'-thiazolyl)-benzoxazole, 2-(2'-thiazolyl)-5-methoxy-benzothiazole, 2-(4'-isothiazolyl)-6-methyl-benzoxazole, 2-[4'-(1',2',3'-thiadiazolyl)]-benzothiazole, and 2-(4'-thiazolyl)-5,6-dimethyl-benzoxazole.

An additional method for making the benzothiazoles and benzoxazoles described herein consists in the reaction of o-aminophenol or o-aminothiophenol substituted, if desired, at the 4- and/or 5-positions, with a carboxylic acid derivative of the five-membered nitrogen- and sulfur-containing heterocyclic ring in a reaction medium comprising polyphosphoric acid. This process is particularly satisfactory for synthesizing the 2-heterocycle substituted benzothiazoles of the invention. It is preferably carried out by intimately contacting about equimolar amounts of the two reactants in a medium comprising 5–20 parts by weight of polyphosphoric acid per part of heterocycle reactant. The heterocyclic carboxylic acid itself may be used as one of the starting materials or, alternatively, a lower alkyl ester or amide of such acid may be employed. The reaction is brought about by heating the mixture at temperatures of 150–215° C., and preferably at about 180–200° C., for 2–4 hours. The 2-substituted benzothiazoles are isolated by quenching the cooled reaction mixture with water and neutralizing the acid with a base such as calcium carbonate, an alkali metal hydroxide or carbonate or ammonium hydroxide. While it can be used if desired, this method is less satisfactory than the one previously described for making the benzoxazole compounds inasmuch as the 2-heterocyclic substituted benzoxazoles described herein are less stable in the presence of hot mineral acid than are the corresponding benzothiazoles.

A third method suitable for synthesizing the compounds of Formula I above comprises the reaction of an o-aminophenol or an o-aminothiophenol which may have alkyl, alkoxy, alkylthio, aryloxy or arylthio groups at the 4- and 5-positions, with a thiazolyl, isothiazolyl or thiadiazolyl aldehyde in a solvent such as a lower alkanol, e.g. methanol, ethanol, isopropanol. The reaction proceeds rapidly to formation of a 2-substituted dihydrobenzothiazoline or dihydrobenzoxazoline of the formula

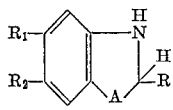

where A, R, $R_1$ and $R_2$ have the same meanings as in Formula I. This dihydro compound is converted to the corresponding benzothiazole or benzoxazole by oxidation, suitable oxidizing agents being ferric chloride, lead tetraacetate, cupric acetate, mercuric acetate and the like.

In accordance with an additional aspect of this invention, there are provided 5,6-benz-2-R-benzothiazoles and benzoxazoles, this compound having the formula

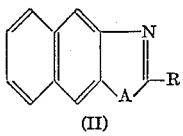

(II)

where A is oxygen or sulfur and R is a five-membered heterocyclic ring containing carbon, nitrogen and sulfur. As will be understood by those familiar with this art, these 5,6-benz compounds are 5,6-disubstituted benzothiazoles or benzoxazoles wherein the 5- and 6-substituents taken together represent a butadienyl group

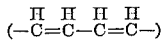

Such compounds may be conveniently prepared by the methods described above and utilizing 2-amino-3-naphthol or 2-amino-3-thionaphthol as starting material for the reaction with the thiazole, isothiazole or thiadiazole carboxylic acid or derivative thereof.

The benzothiazoles and benzoxazoles of this invention, having at the 2-position a thiazolyl, isothiazolyl or thiadiazolyl radical, have a high degree of anthelmintic activity and are therefore useful in the treatment or prevention of helminthiasis in domesticated animals. For this purpose, they may be administered orally as a component of the animal feedstuff, in the drinking water or in salt blocks, in unit dosage forms such as boluses and drenches, and by intramuscular or parenteral injection. The preferred method of administration and the optimum dose level will depend to a large extent on the species of animal being treated, the severity of infection, as well as whether the compound is being employed therapeutically or prophylactically. With animals such as sheep, cattle and goats, it is customary practice to treat the animal periodicaly via oral administration of the anthelmintic. Boluses and/or drenches are usually employed for this purpose, typical examples of which are the following:

|  | Gm. |
|---|---|
| 2-(4'-thiazolyl)-benzoxazole | 6.0 |
| Dicalcium phosphate | 1.0 |
| Starch | 0.702 |
| Guar gum (through 60 mesh screen) | 0.16 |
| Talc (through 60 mesh screen) | 0.11 |
| Magnesium stearate (through 60 mesh screen) | 0.028 |

The bolus is prepared by thoroughly mixing the drug and reducing the mixture to a particle size finer than 60 mesh. To the mixture is added 0.430 gm. of starch in the form of an aqueous starch paste and the resulting mixture granulated in the usual manner. The granules are then passed through a #10 mesh screen and dried at 110–130° F. for about 8 hours. The dried material is then passed through a #16 mesh screen. The guar gum and the balance of the starch are added and the mixture thoroughly blended. The remainder of the ingredients are then added and the whole thoroughly mixed and compressed.

A suitable drench would contain the following ingredients in an ounce of drench composition:

| | | |
|---|---|---|
| 2-(4'-thiazolyl)-benzothiazole | gm | 4.5 |
| Benzalkonium chloride | ml | 0.6 |
| Antifoam emulsion | gm | 0.06 |
| Hydroxyethylcellulose | gm | 0.3 |
| Sodium phosphate monobasic | gm | 0.3 |
| Water to 30.0 ml. | | |

The levels of anthelmintic in these unit dosage forms may be varied within reasonable limits without altering the amounts of other ingredients in the composition.

The benzothiazoles and benzoxazoles of this invention may also be administered to larger domestic animals by incorporation in the so-called protein concentrates which are frequently added as a top dressing to the feed of such animals. Thus, the anthelmintic may be mixed with the protein concentrate at levels of 2–15 gm./lb. of concentrate, the preferred level depending on the size of the animal and its daily consumption of concentrate.

In treating swine it is preferred to incorporate the benzothiazole or benzoxazole into the animal feedstuff at levels of about 0.01% to about 0.2% by weight of the feed. This is conveniently accomplished by first preparing a premix or feed supplement wherein the active ingredient is mixed with a suitable inert carrier in concentrations of from 1–50% by weight. The carrier is normally an animal feed ingredient such as corn distillers' grains, wheat middlings, fermentation residues, soya grits, wheat shorts and the like. These feed supplements are then mixed with the finished feed.

The compounds of this invention are particularly suitable for the removal of the eggs and the larvae of the helminths and are therefore preferred in those instances where prophylactic use or reduction of egg population is desired. For instance, when sheep infected with helminthiasis were treated orally with a single 50 mg./kg. dose of 2(-4'-thiazolyl)-benzothiazole, the post-treatment fecal egg counts were reduced by 75%.

The following examples are given for the purpose of illustration and not by way of limitation.

EXAMPLE 1

2-(2'-Thiazolyl)-Benzoxazole 22 gm. of thiazole-2-carboxaldehyde is heated with 21 gm. of o-aminophenol in 200 ml. of glacial acetic acid at 100° C. for 4 hours. The reaction mixture is then steam distilled to remove acetic acid and unreacted thiazole aldehyde. The residual 2-(2'-thiazolyl)-benzoxazole is then sublimed at a bath temperature of 200° C. and a pressure of less than 0.1 mm. The crude crystalline sublimate thus obtained is purified by recrystallization from a small volume of aqueous ethanol or ethyl acetate.

When this process is carried out employing 28 gm. of 2-amino-4-methoxyphenol as starting material in place of o-aminophenol, there is obtained 2-(2'-thiazolyl)-5-methoxy-benzoxazole.

EXAMPLE 2

2-(4'-Thiazolyl)-Benzoxazole 5.5 gm. (0.05 m.) of o-aminophenol and 6.5 gm. (0.05 m.) of 4-thiazole carboxylic acid are heated at 200° C. for 3 hours in a round-bottom flask. The temperature is then slowly increased, and water and ammonia distilled from the reaction flask. The residue is then cooled and extracted with 3 x 50 ml. of ethanol. The ethanol extracts are combined and concentrated in vacuo to give 2-(4'-thiazolyl)-benzoxazole. This material is purified by dissolving in 50 ml. of hot benzene and pouring the resulting solution onto a 200 gm. column of acid-washed alumina and eluting the 2-(4'-thiazolyl)-benzoxazole with petroleum ether and then with ether (4 x 100 ml. fractions). The petroleum ether and ether eluates are combined, concentrated to dryness and the residue recrystallized from a small volume of ethyl acetate to give substantially pure material, M.P. 157–158° C.

When 0.05 m. of 4-carbethoxy-1,2,3-thiadiazole and 0.05 m. of 2-amino-4-phenoxyphenol are reacted together according to the above method, 2[4'-(1',2',3'-thiadiazolyl)]-5-phenoxy-benzoxazole is produced.

EXAMPLE 3

2-(4'-Thiazolyl)-Benzoxazole 55 gm. of o-aminophenol and 56 gm. of thiazole-4-aldehyde are added to 150 ml. of pyridine, and the mixture warmed to 90° C. for 30 minutes. It is then cooled and poured slowly into 800 ml. of 3 N hydrochloric acid. To the entire mixture is added 50 gm. of ferric chloride in 100 ml. of ethanol and the resulting mixture is heated on a steam bath for 45 minutes. It is then concentrated to a small volume in vacuo, the solution decanted from any solid or oil present, and chilled in an ice bath. 2-(4'-thiazolyl)-benzoxazole crystallizes from the ice-cold solution.

EXAMPLE 4

2-(4'-Thiazolyl)-Benzothiazole 20 gm. (0.155 m.) of thiazole-4-carboxylic acid is converted to the acid chloride by treatment with thionyl chloride and the resulting acid chloride added cautiously to a solution of 19.5 gm. (0.155 m.) of o-aminothiophenol in 100 ml. of benzene. A precipitate forms and the mixture is refluxed for about 2 hours. The hot mixture is then filtered to remove solids. The clear benzene solution is concentrated to a residue which soon solidifies. It melts over a broad range near 150° C. The residue is extracted with Skellysolve B (petroleum ether, B.P. 60–90° C.) overnight in a continuous liquid/liquid extractor. The Skellysolve B extract is concentrated to dryness in vacuo, and the residual solid thus obtained recrystallized from dry ethanol to give substantially pure 2-(4'-thiazolyl)-benzothiazole, M.P. 186–187° C.

2-(4'-isothiazolyl)-6-phenylthio-benzothiazole is obtained in similar fashion from isothiazole-4-carboxylic acid chloride and 2-amino-5-phenylthio-thiophenol.

EXAMPLE 5

2-(4'-Thiazolyl)-6-Methyl-Benzothiazole 4 gm. of 4-methyl-2-mercaptoaniline are added slowly to 4 gm. of 4-thiazole carboxylic acid chloride in 20 ml. of toluene. The resulting mixture is heated at 90–100° C. for 2½ hours. The mixture is then cooled and any solid material removed by filtration. The clear toluene solution is concentrated to dryness in vacuo and the crude residue thus obtained dissolved in 150 ml. of boiling ethanol. The hot ethanol solution is treated with decolorizing charcoal and, after removal of the charcoal by filtration, the alcohol is removed by distillation. The solid product thus obtained is recrystallized from a minimum amount of ethyl acetate to give substantially pure 2-(4'-thiazolyl)-6-methyl-benzothiazole.

EXAMPLE 6

2-(4'-Isothiazolyl)-Benzothiazole

The reaction of 10 gm. of isothiazole-4-carboxylic acid chloride and 10 gm. of o-aminothiophenol in 100 ml. of benzene according to the method of Example 5 yields 2-(4'-isothiazolyl)-benzothiazole.

When the process of Example 5 is carried out employing 16 gm. of 5-methoxy-2-mercaptoaniline and 13 gm. of 3-carboxy-1,2,5-thiadiazole as the starting materials, there is obtained 2-[3'-(1',2',5'-thiadiazolyl)]-5-methoxy-benzothiazole. The crude product obtained on removal of the benzene reaction solvent is purified by heating in 70 ml. of acetic acid at 100° C. for 1 hour. The acetic acid is then removed under vacuum and the resulting solid dissolved in 40 ml. of hot benzene and the solution poured over a 200 gm. column of neutral aluminum. Elution of the column with ethyl acetate and recrystallization of the solid thus eluted from ethanol yields substantially pure material.

EXAMPLE 7

2-(2'-Thiazolyl)-Benzothiazole 12.5 gm. of o-aminobenzenethiol and 12 gm. of thiazole-2-aldehyde are heated together in 50 ml. of pyridine for 40 minutes at a temperature of 90–95° C. At the end of this time the reaction mixture is poured slowly into 180 ml. of 3 N hydrochloric acid. The intermediate product 2-(2'-thiazolyl)-dihydrobenzothiazoline crystallizes slowly from the solution. The solid material is separated by filtration and added to a solution of 12 gm. of ferric chloride in 30 ml. of ethanol. The mixture is warmed on a steam bath for 30 minutes and then diluted with about an equal volume of water. The solution is decanted from any oil that separates and is cooled in an ice bath whereupon 2-(2'-thiazolyl)-benzothiazole precipitates. The product is recovered by filtration and purified by recrystallization from ethyl acetate.

EXAMPLE 8

2-(4'-Thiazolyl)-5,6-Benz-Benzothiazole (A) 9.2 gm. of 2-amino-3-mercaptonaphthalene and 7.5 gm. of thiazole-4-aldehyde are reacted together in 25 ml. of α-picoline according to the procedure of Example 7. After oxidation of the intermediate dihydrothiazoline with lead tetra-acetate, there is obtained 2-(4'-thiazolyl)-5,6-benz-benzothiazole.

(B) 2-(2'-thiazolyl)-5,6-benz-benzoxazole is prepared by the procedure employed in part (A) above using as the starting materials thiazole-2-aldehyde and 2-amino-3-hydroxynaphthalene.

EXAMPLE 9

*2-[4'-(1',2',3'-Thiadiazolyl)]-Benzothiazole*

3 gm. of 4-carbomethoxy-1,2,3-thiadiazole and 4 gm. of o-aminothiophenol are added slowly to 60 gm. of polyphosphoric acid in a nitrogen atmosphere. The mixture is stirred and heated at 185° C. for 3 hours. The solution is then cooled to about 90° C. and poured slowly into 100 ml. of ice water. The solid which forms is removed by filtration and the filtrate neutralized to a pH of about 7 with dilute sodium hydroxide solution. The solid which forms at this point is recovered by filtration, washed with distilled water and dried. It is extracted with five 70-ml. portions of acetone. The acetone extracts are combined and concentrated in vacuo until turbidity. The solution is then chilled to give crystalline 2-[4'-(1',2',3'-thiadiazolyl)]-benzothiazole.

Any departure from the above description which conforms to the present invention is intended to be included within the scope of the claims.

What is claimed is:
1. A compound having the formula

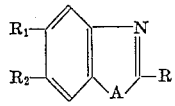

wherein A is selected from the class consisting of oxygen and sulfur, R is a five-membered heterocyclic radical selected from the class consisting of thiazolyl, thiadiazolyl and isothiazolyl rings wherein the point of attachment is at a carbon atom of said ring, and $R_1$ and $R_2$ represent a member of the class consisting of hydrogen, loweralkyl, loweralkoxy, loweralkylthio, phenoxy and phenylthio when taken separately, and the butadienyl radical when taken together.

2. 2-(thiazolyl)-benzoxazole.
3. 2-(thiazolyl)-benzothiazole.
4. 2-(isothiazolyl)-benzoxazole.
5. 2-(thiadiazolyl)-benzothiazole.
6. 2-(4'-thiazolyl)-benzoxazole.
7. 2-(4'-thiazolyl)-benzothiazole.
8. 2-(4'-thiazolyl)-5-methoxy-benzothiazole.
9. 2-(2'-thiazolyl)-benzothiazole.

References Cited in the file of this patent
UNITED STATES PATENTS

| | | |
|---|---|---|
| 2,091,840 | Twinbow | Aug. 31, 1937 |
| 2,282,290 | Swales et al. | May 5, 1942 |
| 2,780,628 | Porter | Feb. 5, 1957 |
| 2,857,392 | Applegath et al. | Oct. 21, 1958 |

OTHER REFERENCES

Elderfield: "Heterocyclic Compounds," vol. 5, page 451.

Martani: Chem. Abstracts, vol. 50, column 5633 (1956).

Elderfield: "Heterocyclic Compounds," vol. 5, pages 420–2, 507 (1957).